United States Patent [19]

Petersen

[11] 4,264,154

[45] Apr. 28, 1981

[54] APPARATUS FOR AUTOMATICALLY CONTROLLING TRANSMISSION OF LIGHT THROUGH A LENS SYSTEM

[75] Inventor: Christian C. Petersen, Westwood, Mass.

[73] Assignee: Polaroid Corporation, Cambridge, Mass.

[21] Appl. No.: 59,563

[22] Filed: Jul. 23, 1979

Related U.S. Application Data

[63] Continuation-in-part of Ser. No. 45,822, Jun. 5, 1979, and a continuation-in-part of Ser. No. 45,830, Jun. 5, 1979.

[51] Int. Cl.³ .................................................. G02C 7/12
[52] U.S. Cl. ....................................... 351/49; 354/235
[58] Field of Search ................. 351/49, 84; 350/132, 350/147; 354/235, 29, 59, 247; 310/13

[56] References Cited

U.S. PATENT DOCUMENTS

| | | | |
|---|---|---|---|
| 1,614,827 | 1/1927 | Coats | 351/49 |
| 1,661,967 | 3/1928 | Savoi | 351/49 |
| 2,005,426 | 6/1935 | Land | 351/85 |
| 2,206,880 | 7/1940 | Coggens | 351/49 |
| 2,251,330 | 8/1941 | Fairbanks | 351/49 |
| 2,304,504 | 12/1942 | Metzger et al. | 351/49 |
| 2,380,481 | 7/1945 | Tillyer et al. | 351/41 |
| 3,903,528 | 9/1975 | Kee | 354/29 |
| 3,922,698 | 11/1975 | Petersen | 354/29 |
| 4,099,858 | 7/1978 | Land | 351/62 |
| 4,119,369 | 10/1978 | Eloranta et al. | 351/49 |
| 4,121,235 | 10/1978 | Fujita et al. | 354/234 |

*Primary Examiner*—John K. Corbin
*Assistant Examiner*—B. W. de los Reyes
*Attorney, Agent, or Firm*—Edward S. Roman

[57] ABSTRACT

An electromagnetic actuator has a motor that indexes an armature element repeatedly by one step from a rest position, and has an electromagnetic clutch coupled with the armature element to increment an optical element that controls light according to relative position. In adjustable polarizing sunglasses, the actuator incrementally rotates a polarized element in each lens in response to the brightness which a sensor receives through the sunglasses. An electrical control circuit compares, in each operating cycle, the sensor signal with high and low reference values to select the motor drive signal.

14 Claims, 7 Drawing Figures

FIG. 5

APPARATUS FOR AUTOMATICALLY CONTROLLING TRANSMISSION OF LIGHT THROUGH A LENS SYSTEM

BACKGROUND

This application is a continuation-in-part of the commonly-assigned applications entitled "Linear Motor", Ser. No. 45,822, and entitled "Shutter Blade Drive System", Ser. No. 45,830, and both filed on June 5, 1979.

This invention provides sunglasses having motor-driven adjustment of optical transmission according to the light level. The motor drive is highly compact and convenient for the wearer. More generally, the invention provides an electromagnetic actuator for positioning a light-controlling element. The driven element can, by way of example, be a transmission-controlling lens element such as a polarizer, a focus-adjusting lens element, or an aperture-defining element.

The invention is described with particular reference to eyeglasses of variable optical transmission, i.e. adjustable sunglasses, but features are suitable for advantageous application in other kinds of optical devices.

In the prior art, sunglasses and other ophthalmic devices are known which have adjustable light transmission. In one type of sunglass, each lens employs two overlying polarizers, one of which is rotatable relative to the other. The user manually adjusts the rotational position of the movable polarizer to provide each lens with the optical density that is comfortable for the given light condition. U.S. Pat. Nos. 4,119,369; 2,565,362; 2,380,481; 2,304,504; 2,251,330; 2,206,880; and 2,005,426 are illustrative of this type of adjustable sunglass.

Another type of adjustable sunglass employs a photochromic composition in each lens. This material undergoes chemical reaction responsive to the level of incident light to provide an automatic change in optical density. The range of variation, and the speed of response, of this type of adjustable sunglass is often limited. One particular instance where the response is limited occurs when the wearer goes from a bright condition to a dark one, such as entering a room from outdoors or driving into a tunnel.

The automatic adjustment of an optical device in response to light intensity is known in other applications. For example, present-day cameras provide automatic exposure control by adjusting the aperture size and/or the shutter speed. This type of light control typically employs adjustment of mechanical elements.

It is an object of this invention to provide improved optical devices that automatically adjust according to light brightness with a mechanical movement. It is also an object to provide such an automatically-adjusting optical device that readily allows manual override of the automatic operation. A further object is that the automatic adjustment elements be compact and light weight, and efficient in terms of electrical power consumption. A particular object is to provide sunglasses having the above advantages. Another object is to provide such sunglasses which provide a high degree of wearer convenience.

It is also an object of the invention to provide an improved actuator for the automatic positional control of an optical element. Particular improvements sought for such an actuator are compactness, mechanical simplicity, low electrical power consumption, and ease of manual or other override.

Other objects of the invention will in part be obvious and will in part appear hereinafter.

SUMMARY OF THE INVENTION

The invention attains the foregoing objects, in one instance, by providing automatically-adjusting sunglasses having a bidirectional indexing motor which a clutch couples selectively to rotate a movable polarizing lens element aligned with another, stationary, polarizing lens element. The motor can index the armature left or right, i.e. forward or backward, in each operating cycle, and automatically returns the armature to a central rest position. The clutch applies only the indexing movement—but not the return motion—to the polarizing element. Hence the motor incrementally shifts the polarizing element in each cycle.

An electronic control circuit drives the motor and the clutch for the foregoing operation in response to a signal responsive to the light sensed behind the aligned lens elements. The circuit compares the sensed signal with two threshold values to select in each cycle whether the operation is to be no movement, i.e. no indexing, forward indexing, or reverse indexing.

The automatic actuator which the foregoing motor, clutch and control circuit provide can be manually overridden. That is, the driven polarizing element can manually be moved without regard to the actuator, or can be held stationary against motion by the actuator, all without damage. Further, the drive system is highly compact. The motor and clutch units for a pair of sunglasses can be constructed with about the size of the eraser on the end of a conventional pencil. The drive system moreover employs no gear train, such as is typically required to couple the high speed of a conventional small motor to attain the desired small and/or relatively slow motion of the driven element. Another feature is that the drive system operates with relatively little electrical power. It draws electrical power only to index the motor and to engage the clutch; the return stroke of the motor results from permanent magnet forces and requires no power. Further features of the automatic, variable-density eyeglasses employing the foregoing construction are that a relatively wide range of light transmission is available, and that the speed of response is essentially the same for both increases and decreases in light level.

The actuator which the invention provides can controllably position a control element in an optical device other than variable density sunglasses. For example, the foregoing advantages and features can be used with advantage in an exposure control system as in a camera or other photo-recording device, to provide an automatically focusing or zooming lens and in an automatically-controlled illumination system such as a motor vehicle headlight, to name but a few. In these and like applications, the actuator controllably positions a light-controlling element such as a non-transmissive aperture-defining element, or a transmissive element in the optical path to receive light within the aperture of the device.

The invention accordingly comprises the features of construction, combinations of elements, and arrangements of parts exemplified in the constructions hereinafter set forth, and the scope of the invention is indicated in the claims.

BRIEF DESCRIPTION OF DRAWINGS

For a fuller understanding of the nature and objects of the invention, reference should be made to the following detailed description and the accompanying drawings, in which.

DESCRIPTION OF ILLUSTRATED EMBODIMENTS

Figures 1, 2:
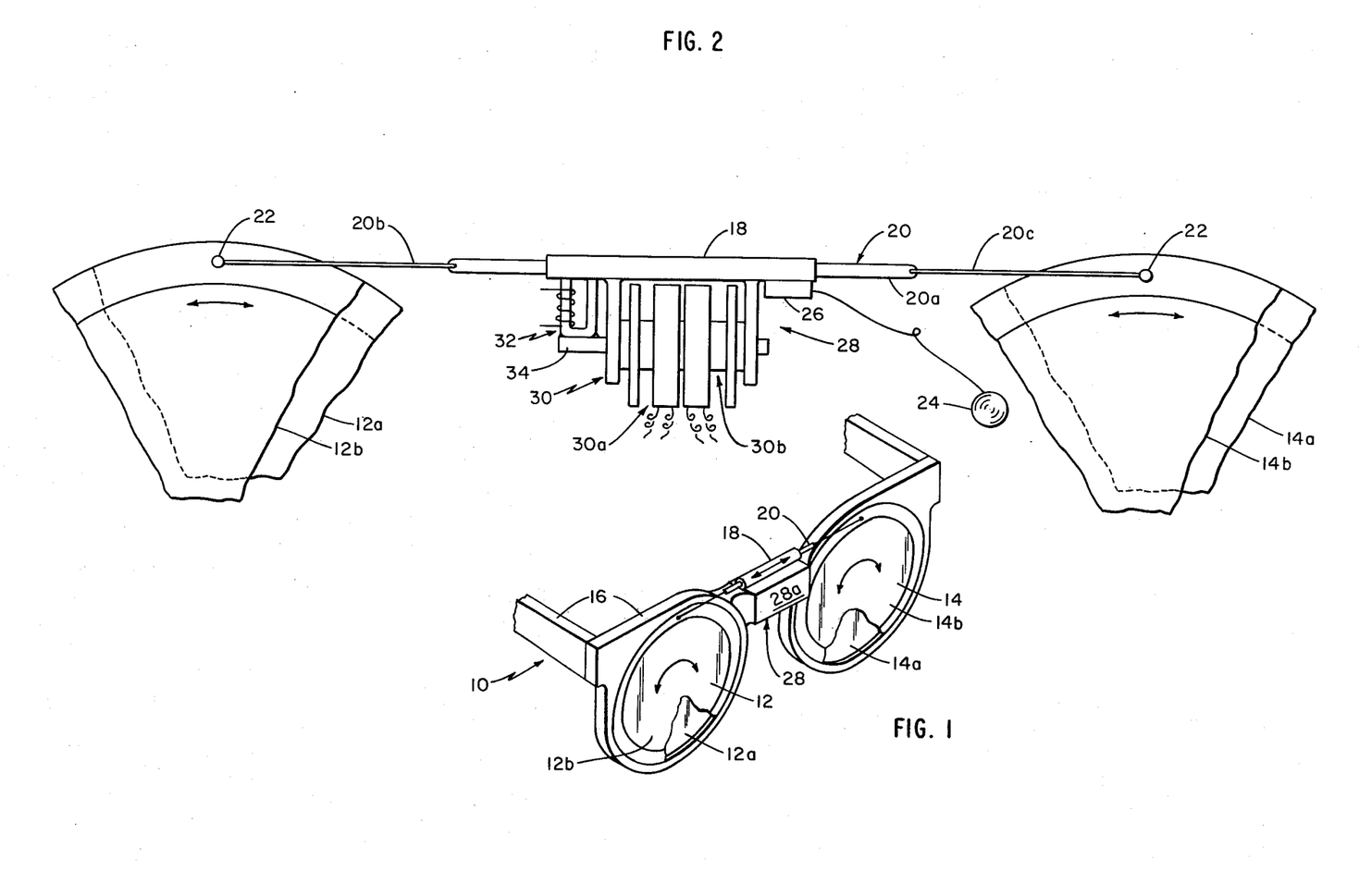
FIG. 1 is a simplified fragmentary isometric view of automatic sunglasses embodying the invention.
FIG. 2 is a fragmentary elevational view of the sunglasses of FIG. 1.

FIG. 1 shows automatically-adjustable sunglasses 10, i.e. eyeglasses with automatically-adjustable optical transmission, in which each lens 12, 14 includes a fixed polarizing element 12a, 14a aligned with a rotatable polarizing element 12b, 14b. The frame 16 of the glasses provides frictional mounting of each rotatable element 12b, 14b. The frictional mounting maintains a given rotational orientation of the rotatable lens elements during normal wearer movement, but allows each to be rotated to adjust the angle between the polarization axes of the two aligned elements 12a and 12b, and 14a and 14b, which form each lens.

As shown in FIGS. 1 and 2, a tube 18 on the frame 16 supports an actuator rod 20. The rod is slidable within the tube across the bridge section of the glasses. The illustrated rod 20 has a relatively stiff central slide section 20a which slidably seats in the tube 18 and from which stiffly flexible tie sections 20b and 20c extend. The free end of each tie section is connected to one rotatable polarizing element 12b, 14b; each connection is by way of a rotatable link adjacent a lens rim. With this arrangement, the tie sections transmit longitudinal movement of the actuator rod 20 to rotate the polarizing elements 12b, 14b.

The eyeglass frame 16 mounts a photoelectric sensor 24 (FIG. 2) behind the lens 14. The sensor is connected with an electrical circuit 26 which develops an electrical signal responsive to the amount of light which reaches the sensor after transmission through the two polarizing elements 14a and 14b. This signal operates an actuator indicated generally at 28 to shift the actuator rod 20 and thereby rotate the polarizing elements 12b, 14b, to maintain a relatively uniform level of light incident on the sensor 24. That is, the actuator responds to the output signal from the circuit 26 to controllably change the rotational orientation of the polarizing elements 12b and 14b to adjust the optical transmission of the sunglass lenses in accordance with the brightness of the light incident on them.

Figure 3:
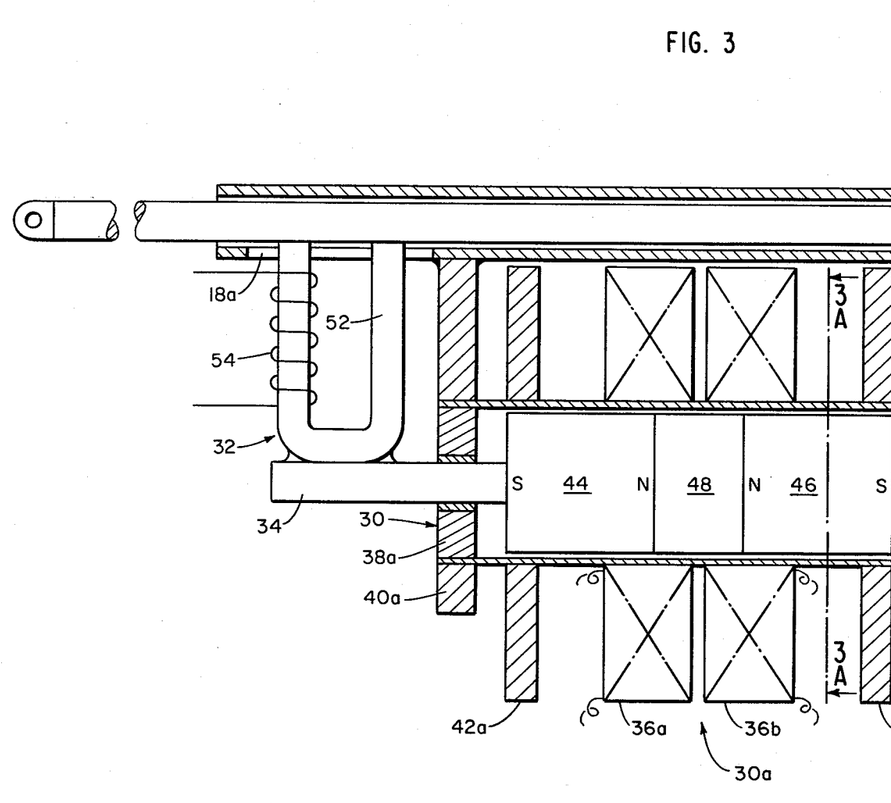
FIG. 3 is an enlarged view in elevation of the actuator for the sunglasses of FIG. 1.

With reference to FIGS. 2 and 3, which show the actuator without the enclosing housing 28a shown in FIG. 1, the illustrated actuator 28 has a motor 30 and clutch 32. The motor has a stator element 30a mounted on the eyeglass frame 16 (FIG. 1), and has an armature element 30b that, in each cycle, can be driven by one incremental step or stroke to the left or to the right. The clutch 32 is mounted on an output arm 34 which is coupled for movement with the armature element 30b, and the clutch selectively couples the incremental armature movement from the output arm to the lens-driving actuator rod 20.

The stator element of the illustrated actuator has a pair of identical and matched electromagnetic coils 36a and 36b. The coils are seated on a non-magnetic cylindrical tube 38 coaxial with one another and closely spaced apart along the tube axis. The tube ends are closed with non-magnetic end caps 38a and 38b, and frame elements 40a and 40b mount the stator element to the eyeglass frame by way of the tube 18. Also mounted on the tube 38 are identical and matched annular plates 42a and 42b of magnetically-permeable material, typically magnetically soft steel. The plates are coaxial with one another and equally spaced outboard from the coils 36a and 36b.

The armature element 30b of the illustrated actuator employs two permanent magnets 44 and 46 and a magnetically-permeable core 48. The magnets and the core are arranged in an axial succession slidably disposed within the tube 38 with a magnet 44, 46 on eiher side of the core 48. Like poles of the two magnets, illustrated as the north pole, are directed axially inward, i.e. toward the core 48. The other, like poles are directed axially outward from the armature element. Each washer-like annular plate 42a, 42b is aligned with its axially outer face coincident with the axially outer pole face of an armature magnet 44, 46, when the armature is in the central position shown in FIG. 3.

The output arm 34 is affixed to and extends axially from the armature element 30b. It passes through the end cap 38a, preferably within a sleeve bearing to enhance sliding motion of the armature element relative to the sleeve. An arm 50 is affixed to and extends axially from the other end of the armature element. This arm passes through the end cap 38b, which preferably also has a sleeve bearing slidably supporting the arm.

Figure 3A:
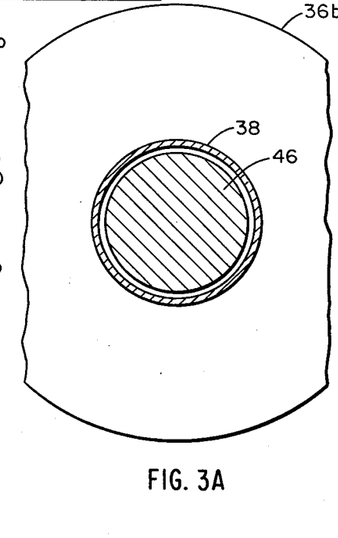
FIG. 3A is a fragmentary sectional view along line 3A—3A of FIG. 3.

With this preferred construction shown in FIG. 3, the actuator has mirror image symmetry about a central plane transverse to the plane of FIG. 3 and passing midway between the coils 36a and 36b. The armature elements 44, 46 and 48 have circular cross sections in this transverse plane, as shown in FIG. 3A. As also shown there, the tube 38 is a hollow cylinder, and the coils 36a and 36b are annular in cross-section.

By way of illustrative example, and without limitation, an actuator constructed in the foregoing manner as shown in FIG. 3 has the following dimensions: each coil 36a, 36b has a 0.075 inch axial length, a 0.140 inch inside diameter, and a 0.375 inch outside diameter. Each permanent magnet 44 and 46 has a 0.125 inch axial length and a 0.125 inch diameter, and the core 48 has the same diameter and has a length of 0.075 inch. The tube 38 has an axial length of 0.420 inch inside the end caps, and has an inside diameter of 0.128 inch. The coils 36a and 36b are spaced 0.010 inch apart. The annular plates 42a and 42b have the same inside and outside diameters as each coil and are 0.005 inch in axial length. The tube 38 and end caps for this construction are suitably made of non-magnetic material such as plastic, and the permanent magnets are rare earth materials that do not demagnetize easily and hence retain magnetism essentially undiminished in face of the offsetting magnetic force which each presents the other. With this construction, the actuator produces a stroke of about 0.50 inch to either side from the central rest position which FIG. 3 shows. The actuator limits the stroke length, as illustrated by employing the outboard faces of the magnets as stops which abut the sleeve end caps.

As FIG. 3 also shows, the clutch 32 employs a horseshoe or U-shaped magnetically-permeable pole piece 52 secured at its base to the output arm 34 and with a coil 54 wound on at least one leg. The two faces of the pole piece 52 project through a slotted opening 18a in the tube 18 for magnetic engagement with the actuator rod 20.

The actuator and clutch operate as follows in the sunglasses of FIGS. 1 through 3. When the actuator is at rest, i.e. with no current in either coil 36a, 36b, the interactions of the permanent magnet fields with the magnetically-permeable annular plates 42a and 42b produce a force field which maintains the armature centrally disposed, relative to the annular plates and hence relative to the stator coils, in the rest position which FIG. 3 shows. In this position, the pole piece 48 is axially offset from alignment with either coil. That is, the permanent magnet fields produce forces that tend to align the axially outer armature pole faces with the stator plates 42a and 42b. The permanent magnet fields thus restore and maintain the armature element in the central rest position shown, in the absence of magnetic fields due to current in either coil.

In response to an electrical signal from circuit 26 (FIG. 1) calling for example for less light transmission through the sunglasses, only one coil 36a is energized with a direct current; the other coil 36b receives no current and remains quiescent. The energized coil 36a produces an electromagnetic field which draws the armature core 48 axially further into alignment with the energized coil. This movement displaces the armature element 30b to the left (FIG. 3). The clutch coil 54 is energized at the same time to latch the clutch pole piece 52 to the actuator rod 20. The clutch accordingly clams the rod to move with the armature element, so that the left stroke of the motor 30 is transmitted directly to the actuator rod 20. This left-wise stroke of the rod 20 rotates each lens element 12b and 14b counterclockwise by one angular step. This rotation, relative to the fixed lens elements 12a and 14a, increases the angle between the polarization axes of the two elements in each lens. The rotation hence darkens each lens, i.e. decreases the light transmission through it, as desired.

The actuating current applied to the clutch coil 54 terminates prior to or essentially coincident with (but not later than) termination of the drive pulse applied to the actuator coil 36a. Accordingly, upon completion of the left stroke of the actuator, the clutch is de-energized and releases engagement with the actuator rod 20. The restoring force which the actuator produces when both coils are de-energized returns the armature element to the center rest position of FIG. 3. This return or centering motion does not disturb the rotatable lens elements 12b, 14b, due to the release of the clutch 32. The frictional mounting of the rotatable lens elements in the frames overcomes any frictional or residual magnetic drag that may be present between the clutch pole piece and the actuator rod.

A drive signal applied to the other actuator coil 36b drives the armature element to the right in FIG. 3, and coincident actuation of the clutch coil 54 transmits this motion to the actuator rod to produce an incremental clockwise rotation of the rotatable lens elements. This rotation increases the transmission through each lens.

Upon subsequent de-energization of the clutch coil and of the actuator coil, and permanent-magnet restoring force quickly returns the armature element to the rest position, but the rotatable lens elements remain in the incremental position.

In this manner, a succession of current pulses to either coil of the actuator unit, simultaneous with current pulses to the clutch coil 54, produces a ratchet-like stepping of the actuator rod 20 to either the right or the left in FIG. 3. The resultant progressive incrementing of the rod produces a corresponding counterclockwise, or conversely clockwise, stepping rotation of the sunglass lens elements 12b, 14b.

The wearer of the sunglasses at any time can shift the sunglass lenses manually to a different position, or hold them stationary against drive from the actuator. The manual force of the wearer readily overrides and resists whatever force the actuator applies to the actuator rod 20. This manual override in no way interferes with or damages the operation of the actuator, or of any other element of the sunglasses. The only consequence is that the clutch pole piece 52 slides relative to the actuator rod, rather than driving the actuator rod to move with it or that the armature does not move.

Figure 4:
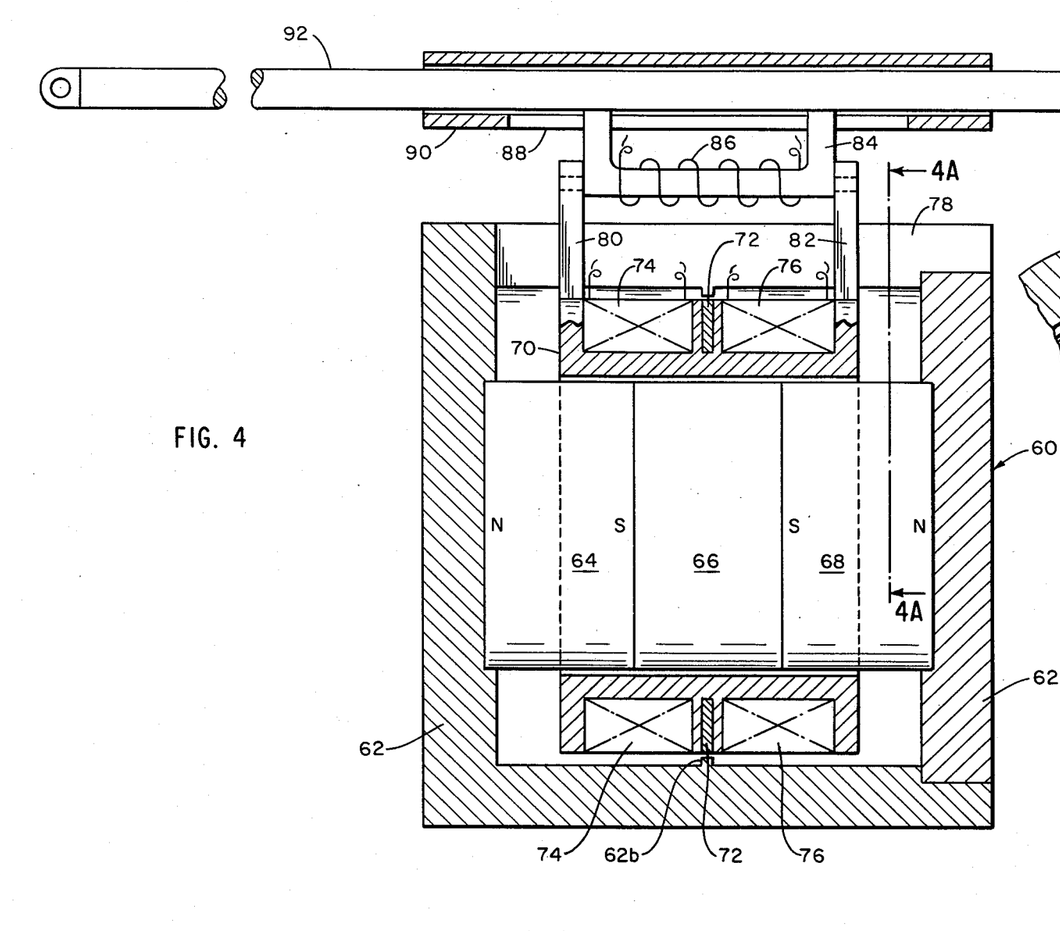
FIG. 4 is a view similar to FIG. 3 of another construction for an actuator according to the invention.
Figure 4A:
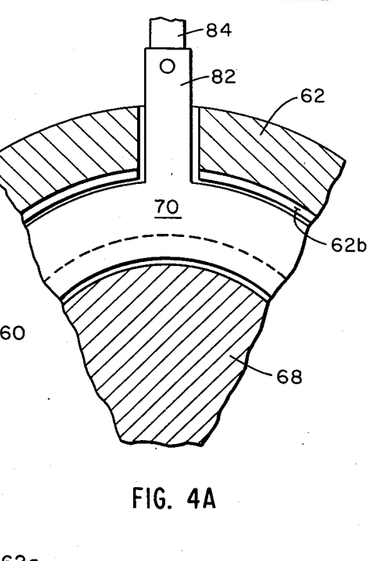
FIG. 4A is a fragmentary sectional view along line 4A—4A of FIG. 4.

FIG. 4 shows an alternative actuator construction in which the armature element embraces the actuator coils, and the permanent magnets and core are in the stator element. Another alternative it illustrates is replacement of the two outboard annular plates 42a and 42b of FIG. 3 with a single centrally-disposed plate. This latter alternative can be practiced in the actuator of FIG. 3 as well as with the arrangement of FIG. 4. More particularly, the electromagnetic actuator 60 of FIG. 4 has a closed hollow cylindrical housing 62 of magnetically-permeable material. Fixedly seated coaxially within the housing are a permanent magnet 64, a magnetically-permeable core 66, and a permanent magnet 68 arranged in axial succession to form a cylindrical rod-like structure. These parts form the stator element of the actuator 60.

The actuator armature element employs a bobbin 70 of nonmagnetic material, typically an electrically-insulating material, with inner and outer surfaces of circular cross-sections. The bobbin is slidably seated on the core and permanent magnet structure within the housing 62. The bobbin carries an annular ring 72 of magnetically-permeable material at its axial center, and carries a coil 74, 76 on either side of the annular ring. The permanent magnets 64 and 68 are poled with like poles axially outward so that the other like poles are directed axially inward in abutment with the core 66.

Again by way of illustrative example, the FIG. 4 actuator construction can employ permanent magnets 64 and 68 each with a diameter of 0.125 inch and an axial length of 0.065 inch. The core 66 has the same diameter and has an axial length of 0.070 inch. The housing 62, which seats the permanent magnets in end recesses as shown, has an axial inner length of 0.190 inch and an inner diameter of 0.2 inch. The bobbin 70 has an inner diameter of 0.128 inch, mounts an annular ring 72 of 0.005 inch length, and mounts coils 74 and 76 each of 0.045 inch axial length. The length of this bobbin is 0.125 inch. The external dimensions of the housing 60 for this construction are a diameter of 0.26 inch and a length of 0.24 inch.

The illustrated housing 62 is of magnetic permeable material (steel) as desired to isolate the magnetic fields of the actuator from the environment. To increase the efficiency and the precision with which the actuator returns the armature element to the rest position shown, the housing inner surface is radially spaced by an air gap from the coils 74, 76. However, opposite the axial central position of the ring 72 when the armature element is at rest, there is a lesser, clearance gap to form a radially-projecting housing pole piece 62b. In the foregoing specific embodiment, the radial air gap between the annular pole piece 62b and the ring 72 at the bobbin outer surface is in the order of 0.005 inch, and this gap radially projects from the housing inner wall by approximately 0.015 inch.

With further reference to FIG. 4, the housing 62 has an axial slot 78 extending the entire length of the interior free space. Radial armature arms 80 and 82 on the bobbin 70 extend outward from the housing through the slot 78. The armature arms 80 and 82 carry an electromagnetic clutch pole piece 84 wound with a coil 86. The ends of the U-shaped pole piece extend through an elongated slot 88 in a slide tube 90 which supports the lens-moving actuator 92, which corresponds to the rod 20 described above with reference to FIGS. 1, 2 and 3.

The illustrated armature bobbin 70 accordingly is a short flanged cylindrical element having radially projecting lugs at either axial end which form the arms 80 and 82. The sliding engagement of these arms in the housing slot 78 maintains a fixed rotational position of the bobbin relative to the actuator housing 62. Further, the arms couple the incremental movement of the armature element to the clutch pole piece 84, which in turn couples it to the actuator load, i.e. to the sunglass-controlling actuator rod 92.

The electromagnetic actuator 60 of FIG. 4 operates in a manner similar to that described above with reference to the actuator of FIGS. 2 and 3 except that movable and stationary elements are reversed. In particular, when the FIG. 4 actuator is quiescent, i.e. there is no current in either coil 74 or 76, the fields of permanent magnetics 64 and 68 interact within the housing 62 with the armature-carried annular ring 72 to produce forces which tend to center the armature-forming bobbin 70. The magnets and the ring hence place and maintain the bobbin in the rest position which FIG. 4 shows. The application of current to either one coil 74 or 76 produces an electromagnetic field which interacts with the stationary core 66 in a manner to translate the bobbin 70 to either the left or the right in FIG. 4, the direction depending on which coil 74 or 76 is energized. The limit of the bobbin travel is provided by abutment with the axial end walls of the housing 62. Upon termination of the current in whichever coil 74, 76 is activated, the incrementing magnetic force terminates and the permanent magnet fields promptly restore the bobbin 70 to the central rest position. The electromagnetic clutch which coil 86 and pole piece 84 form operates in the same manner as the corresponding elements in FIG. 3 to enable the actuator of FIG. 4 to provide a step-by-step ratcheting movement which can shift the actuator rod 92 progressively to the left or to the right in FIG. 4.

An advantage of the FIG. 4 construction is that the movable armature element has less mass than is generally obtainable with the FIG. 3 construction where the permanent magnets and pole piece constitute the armature element. Accordingly, the FIG. 4 construction has advantages which stem from a lower inertia armature. Conversely, the FIG. 3 embodiment employing two annular plates 42a and 42b, when contrasted with use of a single annular ring 72 as in the FIG. 4 embodiment, may provide more precise return positioning of the armature element.

Figure 5:
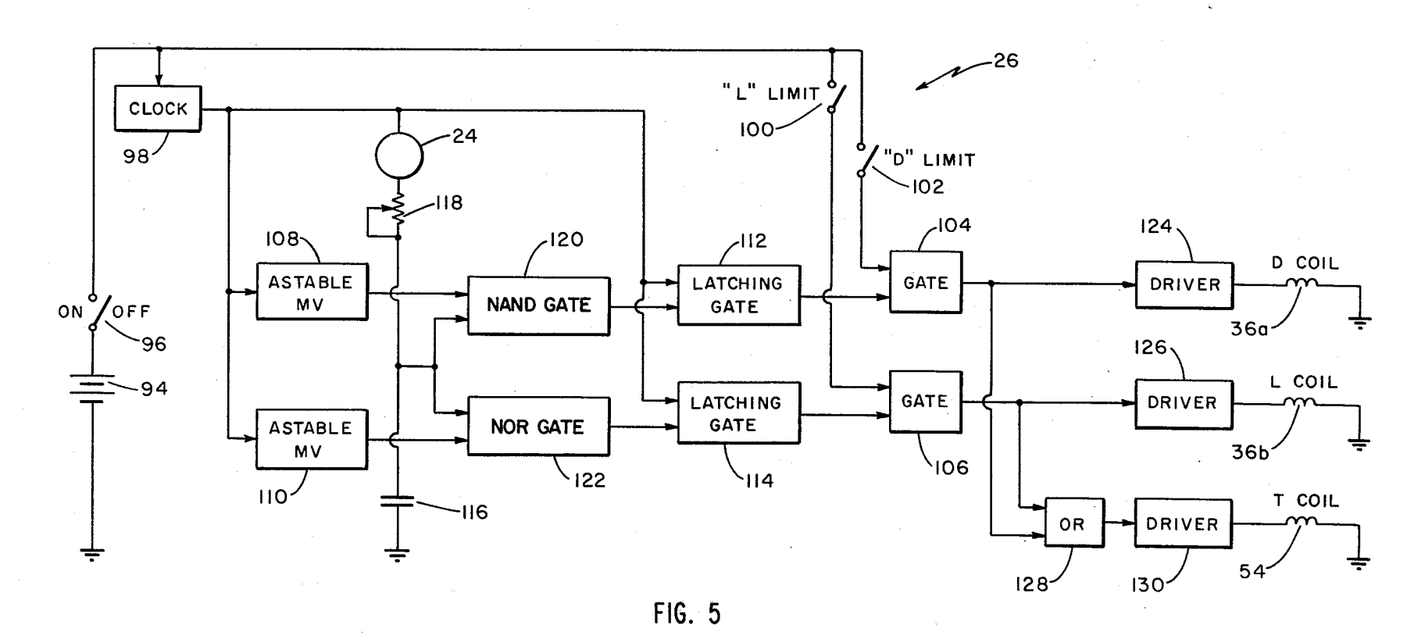
FIG. 5 is a block schematic drawing of an electrical circuit for use with the foregoing embodiments.

With reference now to FIG. 5, the illustrated circuit 26 of FIG. 2 has a battery 94 in series with a single pole, single throw on-off switch 96 to energize a clock 98 and, by way of limit switches 100 and 102, to disable gates 104 and 106. The sequence of timing pulses output from the clock 98 is applied to trigger astable multivibrators 108 and 110, to enable latching gates 112 and 114, and to cycle the charging of a timing capacitor 116 through the photocell sensor 24, preferably through a series trimming resistor 118. Input signals to a NAND gate 120 are the output level from multivibrator 108 and the voltage across the timing capacitor. Similarly, a NOR gate 122 receives the timing capacitor voltage and the level from multivibrator 110. The output signals from the gates 120 and 122 are applied to latching inputs of the gates 112 and 114, respectively. Gates 104 and 106, when not disabled by closure of the limit switches 100 and 102, apply the latching-gate output signals to drivers 124 and 126, respectively. The driver 124 drives the coil 36a of the FIG. 2 actuator which rotates the lens elements to darken the eyeglasses, and the driver 126 is connected to drive the other actuator coil 36b. In addition, an OR circuit 128 actuates a driver 130 for energizing the clutch coil 54 when either driver 124 or 126 receives an assertive input signal.

The multivibrators 108 and 110 have selected different astable periods. The circuit drives the darken coil 36a when the sensor 24 receives sufficient light to charge the capacitor 116 to a selected level before termination of the shorter astable period of multivibrator 108. Conversely, when the sensor 24 receives such a low level of light that the timing capacitor 116 does not reach the selected level before the longer astable period of multivibrator 110 terminates, the circuit energizes the lighten coil 36b.

A third operation available during each operating clock cycle is that neither coil is driven. This occurs when the sensor receives a selected correct light level such that it charges the capacitor 116 to the threshold level during the interval between termination of the two different astable periods. In this condition, neither gate 120 and 122 produces an assertive output signal, and neither actuator coil is driven.

More particularly, each pulse from the clock 98 initiates a new operating cycle. In each cycle, the NAND gate 120 produces an assertive output signal when the timing capacitor voltage applied to it attains or exceeds a level equivalent to a binary logic 1 signal level coincident with application of the astable level (binary logic level 1) from multivibrator 108. This occurs when the capacitor is charged to the selected level (binary logic 1) while the multivibrator 108 is in the astable (binary logic 1) condition. The resultant assertive signal from the NAND gate 120 latches gate 112 to the assertive condition, provided the gate is enabled as occurs for the duration of each clock pulse. The assertive output from the latching gate 112 actuates the driver 124, to rotate the sunglass lens elements 12b and 14b to darken the light transmission, except when the sunglasses are in the maximum allowable dark condition as sensed by a dark-limit switch 102 on the sunglasses. Closure of the switch 102 disables the gate 104.

Conversely, the NOR gate 122 produces an assertive output signal when the timing capacitor level does not attain the binary logic 1 signal level coincident with the multivbrator 110 being in the astable binary logic 1 condition. This occurs when the multivibrator returns to the stable (binary logic 0) state prior to capacitor 116 attaining the selected binary logic 1 charge level. When this occurs, the NOR gate actuates the latching gate 114, which is enabled during the duration of each clock pulse and, providing a light-limit switch 100 is not closed for disabling gate 106, the driver 126 is actuated.

As noted, the OR circuit 128 actuates driver 130 to energize the clutch coil 54 during actuation of either actuator coil. One particular embodiment of the circuit 26 operates in this manner with a clock period of two seconds and a clock pulse of twenty millisecond duration. The longer astable period is six milliseconds, and the shorter one is five milliseconds.

The on-off switch 96 is mounted on the eyeglasses 10 of FIG. 1 for access by the wearer. The limit switches 100 and 102 are arranged to respond to rotation of either rotatable lens element 12b, 14b to desired positions of maximum light transmission and of maximum light blockage, respectively. The limit switches and the gates 104 and 106 can of course be eliminated where limit control of the lens adjustment is not needed.

The actuator described above thus draws significant electrical power only during a small portion of each clock cycle. Further, it requires power for only half of each incrementing motion, for the return travel of the motor armature is powered exclusively by permanent magnets. The actuator in addition requires no gear train or like linkages, and the motor position is always known when the system is turned off. The actuator can be constructed with truly miniature dimensions, yet the output motion can safely be overridden.

Although described as having a symmetrical structure and balanced magnetic and electromagnetic elements, the invention can be practiced with an actuator that is non-symmetrical and unbalanced. In this instance the actuator will produce right and left, or forward and backward, strokes of different lengths. An eyeglass can employ this arrangement, for example, to provide faster brightening of the lenses, for prompt increase in vision upon entering a dark area, than the darkening operation.

It will thus be seen that the objects set forth above, among those made apparent from the preceding description, are efficiently attained. Since certain changes may be made in the above constructions without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In an automatic apparatus for continuously providing light responsive mechanical adjustment of the intensity of the light transmitted through a lens system by displacing at least one optical element of the lens system relative to a supporting member, the improvement comprising:

electrical control means for continuously sensing the intensity of light transmitted by the lens system and for continuously providing an electrical control signal responsive to a deviation in the intensity of the sensed light from a preselected level of light intensity; and electromagnetic actuator means for displacing the one optical element of the lens system relative to the supporting member in response to said electrical signal to maintain the intensity of light transmitted by the lens system substantially at said preselected level of light intensity regardless of changes in the intensity of light incident to the lens system.

2. The apparatus of claim 1 wherein said electromagnetic means comprises:

motor means mounted with respect to the supporting member for displacing the optical element relative to the supporting member, said motor means having a stator and an armature, one of which includes a permanent magnetic means and the other of which includes a magnetically permeable means and an electromagnetic means, said permanent magnet means, said magnetically permeable means and said electromagnetic means, all cooperatively arranged with respect to each other for urging said armature to an intermediate rest position when said electromagnet means is inactive and being further cooperatively arranged for drivingly indexing said armature to a first position offset from said intermediate rest position in response to activation of said electromagnet means with an applied first electrical control signal; and clutch means for selectively coupling the optical element for displacement with the armature of said motor means, said clutch means being normally disengaged and being selectively engageable for displacing the optical element in response to said indexing of said motor armature.

3. The optical apparatus of claim 2 including the further improvement in which the apparatus is an eyeglass device, the support member is an eyeglass frame, the lens system includes a first polarizing element in fixed connection to the frame, and the optical element includes a second polarizing element overlying the first polarizing element and in rotatable connection with respect to the frame such that said motor means operates by way of said clutch means to rotate the second polarizing element over the first polarizing element to control the amount of light transmitted by the lens system.

4. The optical apparatus of claim 3 including the further improvement in which said motor armature is drivingly indexable from said rest position, in a direction opposite to movement to said first offset position, to a second offset position in response to application of a second electrical control signal to said electromagnet means, and in which said control means is arranged for actuating said clutch means concurrently with the application of either electrical signal to said electromagnet means.

5. The optical apparatus of claim 3 including the further improvement in which said clutch means includes first and second electromagnetically-engageable elements, one of which is mounted for movement with said motor armature and the other of which is mounted for movement with the optical element.

6. The optical apparatus of claim 3 including the further improvement in which said control means is arranged for terminating the actuation of said clutch means not later than termination of said first electrical signal.

7. The optical apparatus according to claim 3 including the further improvement in which said control means includes a photoresponsive element arranged for sensing light which the lens system transmits wherein said control means operates to produce said first signal in response to a selected parameter of the sensed light.

8. The optical apparatus according to claim 4 including the further improvement in which said control means includes a photoresponsive element arranged for sensing light which the lens system transmits wherein said control means produces said first signal in response to the sensing of light above a first select intensity level, and produces said second electrical signal in response to sensing of light below a second select intensity level less than said first select intensity level, and produces neither of said first and second signals in response to the sensing of light between said first and second select intensity levels.

9. The optical apparatus of claims 7 or 8 including the further improvement in which said control means includes clock means for providing continuous cyclic operation of said light sensing and control signal functions.

10. The eyeglass device of claim 9 wherein said actuator means comprises a stator mounted with said frame and an armature movable relative to said frame, one of which includes a permanent magnet means and the other of which includes a magnetically permeable means and an electromagnet means, said permanent magnet means, said magnetically permeable means, and said electromagnetic means being cooperatively arranged with respect to each other for urging said armature to an intermediate rest position when said electromagnet means is inactive, and being further cooperatively arranged for drivingly indexing said armature to at least one selected position offset from said intermediate rest position in response to activation of said electromagnet means with said electrical signal; and clutch means for coupling said optical element for displacement in accordance with said indexing of said armature from said center rest position to said offset position and further arranged for subsequently uncoupling said optical element to allow said armature to move from said offset position back to said rest position without moving said optical element.

11. An automatic variable light transmissive eyeglass device for continuously providing light-responsive mechanical adjustment of the intensity of the light transmitted by the device to the eye of the user, said device comprising:

an eyeglass frame;

lens means mounted with respect to said frame for controlling the light transmitted by the eyeglass device, said lens means including at least one light transmissive optical element mounted for displacement with respect to said frame for controlling the intensity of light transmitted through said lens means;

electrical control means for continuously sensing the intensity of light transmitted by the eyeglass device, and for continuously providing an electrical control signal responsive to a deviation in the intensity of the sensed light from a preselected level of light intensity; and electromagnetic actuator means for displacing said optical element relative to said frame in response to said electrical control signal to maintain the intensity of light transmitted by the eyeglass device substantially at said preselected level of light intensity regardless of changes in the intensity of light incident to the eyeglass device.

12. The eyeglass device of claim 11 wherein said frame includes means for mounting said optical element thereto and for retaining said optical element in a fixed position relative to said frame, said actuator means operating to overcome the retention of said optical element in said fixed position by said frame.

13. The eyeglass device of claim 11 in which said lens means further includes a polarizing element in fixed connection to said frame and said optical element includes a second polarizing element overlying said first polarizing element and in rotatable connection relative to said frame for adjusting the amount of light transmitted through said lens means.

14. The eyeglass device of claim 11 in which said electrical control means includes clock means for providing continuous cyclic operation of said light sensing and control signal functions.

* * * * *